Aug. 26, 1969     R. H. NORRIS     3,463,952
COOLING DUCTS FOR FIELD COILS
Filed April 20, 1966

INVENTOR.
ROLLIN H. NORRIS
BY *James C. Davis Jr.*
HIS ATTORNEY

United States Patent Office 3,463,952
Patented Aug. 26, 1969

3,463,952
COOLING DUCTS FOR FIELD COILS
Rollin H. Norris, Schenectady, N.Y., assignor to General Electric Company, a corporation of New York
Filed Apr. 20, 1966, Ser. No. 543,853
Int. Cl. H02k 9/02
U.S. Cl. 310—58                                  3 Claims

ABSTRACT OF THE DISCLOSURE

In a dynamoelectric machine, an internally cooled conductor bar comprises two bar portions secured together by suitable means such as insulating tape wrapped thereabout at spaced intervals along the bar. Interposed between the two bar portions is a spacer wire, which spacer wire extends from one side of the conductor bar to the other side to form one or more ventilating passageways therethrough. The spacer wire extends between opposed sides of the bar portions in a generally serpentine manner so that a plurality of ventilating passageways are formed. The spacer wire, at each side of the conductor bar extends outwardly therefrom a short distance and this "loop" is bent against the side wall of one of the bar portions so that when the conductor bar is assembled, the spacer wire is held in place between the bar portions, and the coolant gas can flow between the two portions without being obstructed by the "loop."

---

Figure 1:
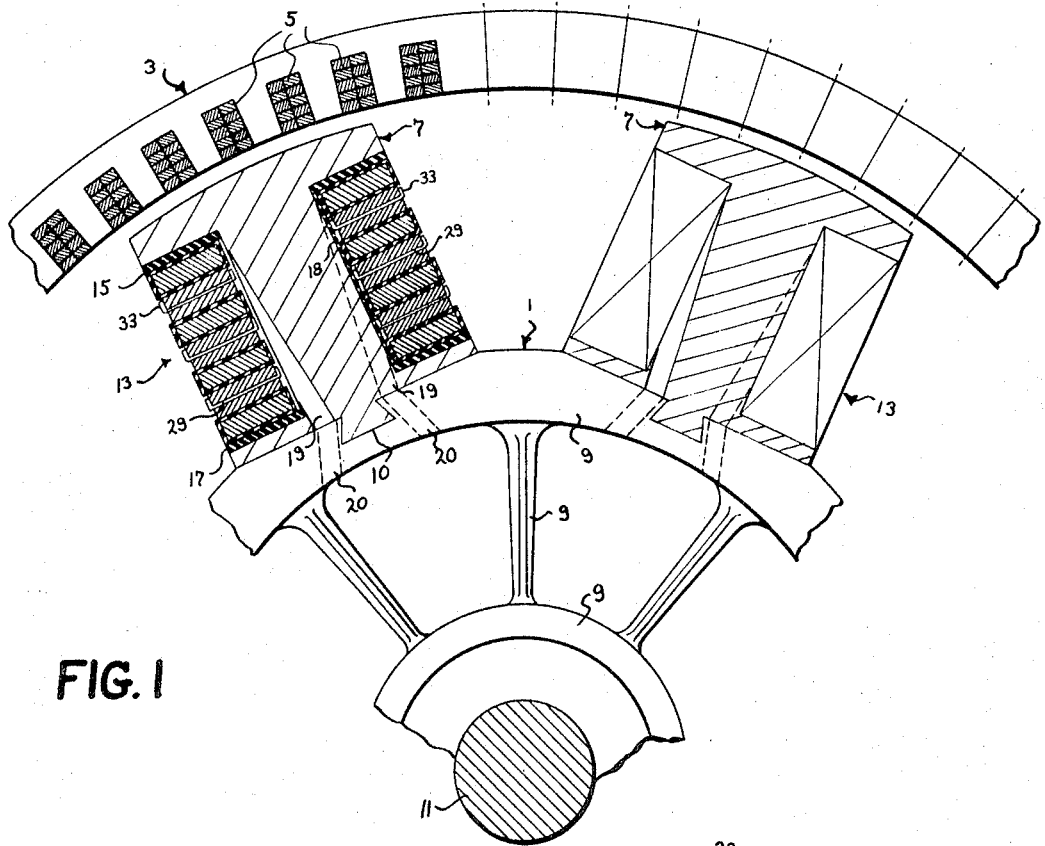

The present invention relates to dynamoelectric machines and more particularly to an improved ventilating arrangement for dynamoelectric generators.

Conventionally, generators used to supply large amounts of electrical power include a stationary outer magnetic core member having slots about its inner periphery in which are disposed windings which provide alternating-current power when excited by a rotor core member. A rotor core member is concentrically disposed within the stator member and has a plurality of slots which contain a field exciting winding energized by a direct current. To produce generator action, the rotor core member is rotated by a prime mover, such as a steam or hydraulic turbine, and electrical energy is taken from the stator windings. As the power output obtainable from such a generator is proportional to the rotor excitation amperes, the number of turns in the rotor winding and the quantity of magnetic flux linking the field and armature circuits, the generator output may be increased by increasing the rotor excitation. To do this, however, the armature and field windings as well as other critical parts of the generator must be adequately ventilated in order to prevent the temperatures thereof from rising to a level great enough to cause damage to the armature and/or field winding insulation as well as other structural parts of the generator.

Some generators capable of delivering large amounts of power have heretofore been ventilated by utilizing a fan to drive large amounts of cooling air through passageways in the rotor conductors. One method of forming these ventilating passageways consists of cutting away material from the copper strip which is used to form the field coil so that there is created an air duct therein. However, this requires an elaborate mechanism for performing the cutting or forming of the copper strip which in turn makes the cost of the method somewhat prohibitive.

A second method used by the prior art for ventilating field coils on dynamoelectric generators is to use relatively thick turn-to-turn insulation on the field coils and then cut away portions of the insulation at predetermined intervals so as to form slots between adjacent turns of the field coil. These slots then serve as ventilating ducts. However, one serious disadvantage to this method is that electrically conducting contaminants (e.g., metal chips) may lodge in the air ducts and cause turn-to-turn short circuiting of the field coils.

One still further method used by the prior art is to provide a two-part conductor bar in which a preformed grid member is disposed between the two conductor parts to form one or more ventilating passageways therethrough. With this arrangement, however, there is still a requirement that the grid members be preformed and fitted between the opposed conductor parts. Further, additional supporting means may be needed to add mechanical strength to the structure in order to prevent the conductor parts from caving in the grid member.

One object of the present invention is to provide an improved ventilating arrangement for a dynamoelectric machine.

A further object of the present invention is to provide an improved ventilating passageway in a dynamoelectric generator.

Still another object of the present invention is to provide an improved field coil conductor bar construction for a dynamoelectric generator.

Briefly, one form of the present invention comprises, in a dynamoelectric machine, an internally cooled conductor bar comprising two bar portions secured together by suitable means such as insulating tape wrapped thereabout at spaced intervals along the bar. Interposed between the two bar portions is a spacer wire, which spacer wire extends from one side of the conductor bar to the other side to form one or more ventilating passageways therethrough. In a preferred embodiment of the present invention, the spacer wire extends between opposed sides of the two bar portions in a generally serpentine manner so that a plurality of ventilating passageways are formed. The spacer wire at each side of the conductor bar extends outwardly therefrom a short distance and this "loop" is bent against the side wall of one of the bar portions so that when the conductor bar is assembled, the spacer wire is held in place between the bar portions, and coolant gas can flow between the two portions without being obstructed by the "loop."

Additional objects and advantages of the present invention, together with a better understanding thereof, will be readily apparent by referring to the following detailed description of the present invention together with the accompanying drawing.

Figure 2:
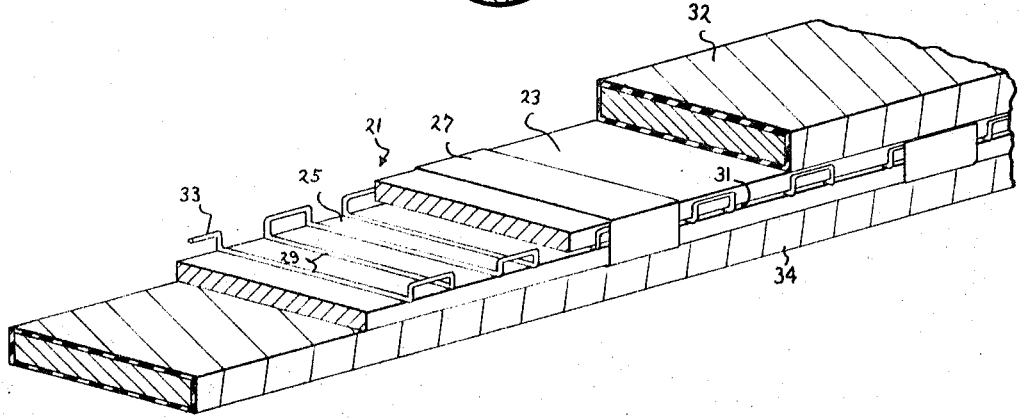

FIGURE 1 is a section view of a portion of a typical salient pole dynamoelectric generator in which the present invention is incorporated, and FIGURE 2 is a cutaway perspective view of conductors featuring ventilation means in accord with the invention.

Referring now to FIGURE 1, there is shown a typical salient pole dynamoelectric generator comprising a rotor 1 and a concentric stator 3. Mounted in slots on the stator 3 is an armature winding 5 from which the output of the generator is taken. The rotor 1 includes a plurality of salient poles 7 mounted on a spider 9 which in turn is mounted to the generator shaft 11. Each salient pole 7 has an exciting winding 13 wound thereon and which is energized from a suitable source of direct current (not shown) so that upon rotation of the rotor 1 by a prime mover, such as water for a hydroelectric generator or steam for a turbine generator, a voltage is generated in the armature winding 5.

The poles 7 are mounted on the spider 9 by utilizing a "dovetail" connection 10 of the poles 7 to the spider 9. Although any connection can be used, it has been found that this type of connection provides a satisfactory retaining force so that the salient poles 7 do not disengage themselves from the rotor 1 and seek location elsewhere as by engagement with the surrounding stator 3.

Each salient pole 7 is generally of a rectangular mushroom shape with the neck portion of the pole having disposed therein the exciting winding 13, which, as previously mentioned, carries direct current and provides excitation for the pole 7. Upper 15 and lower 17 retaining collars are used to fixedly position the exciting winding 1 with respect to the salient pole 7 and the rotor spider 9. Suitable space blocks and coil side straps (not shown) can be used additionally in accord with well-known techniques.

Cooling air is supplied to the exciting winding 13 through passageways 19 in the rotor 1, which passageways 19 receive cooling air by "rim ventilation"; that is, air enters the interpolar spaces radially through slots 20 on the rim of the rotor. This arrangement is not shown in detail as the specific construction thereof forms no part of the present invention. The inner coil side spacer 18 includes apertures aligned with the ventilation openings from passageways 19, so as not to unduly restrict flow.

There is shown in FIGURE 2 a typical elongated conductor bar 21 comprising upper 23 and lower 25 conducting bar portions secured together, as by means of insulating tape 27 placed about the conductor bar 21 at spaced intervals, but separated over at least a portion thereof by means of a spacer wire 29. The spacer wire 29 is used to form a plurality of substanially transversely extending, ventilating passageways 31 in the conductor bar so that air entering from the cooling passageways 19 may flow through these ventilating passageways 31 to cool the conductor bar 21. Note that the insulating tape 27, or other suitable securing means should not block the ventilating passageways 31.

In a typical generator assembly, a plurality of conductor bars 21 are used in forming the exciting winding. In this instance not every conductor bar need be ventilated so that adjacent bars 32 and 34, which are not ventilated, may individually be wrapped with an insulating tape, as illustrated, so that the ventilated bars will be insulated therefrom.

The spacer wire 29 preferably extends along the conductor bar for as great a length as may be desired and at each side of the conductor bar 21, the spacer wire 29 is bent against the side wall of either the upper 23 or lower 25 conductor bar portions in order to hold the spacer wire firmly in place when the conductor bar portions are assembled to form the conductor bar 21. In the preferred embodiment of the present invention the spacer wire 29 extends in a generally serpentine manner continuously along the conductor bar so that a plurality of cooling passageways are formed in the conductor bar.

When utilizing the above-mentioned arrangement, it should be noted that the thickness of the spacer wire 29 should not exceed the thickness of the conductor bar portions against whose side wall it is bent; otherwise, the bent portion 33 of the spacer wire 29 will be positioned too close to the adjacent conductor bar with a consequential danger of turn-to-turn electrical short circuiting being the result. Further, if the thickness of the spacer wire 29 at the bent portion thereof exceeds the thickness of the conductor bar portion against which it is bent, this excess thickness may provide a constriction in the ventilating passageway 31 which interferes with the air flow therethrough.

It has also been found that the use of a square cross-section spacer wire 29 avoids placing unnecessarily high compressive stresses on the spacer wire.

Thus, it can be seen that by utilizing such a construction as has been described hereinabove, the manufacture and assembly of dynamoelectric generators and, in particular, the ventilating thereof is greatly simplified.

While I have shown and described only the preferred embodiment of the present invention, it will be obvious to those skilled in the art that various changes and modifications may be made without departing from the present invention in its broader aspects and, therefore, it is the intention of the appended claims to cover all such changes and modifications as fall within the true spirit and scope of the present invention.

What I claim as new and desire to secure by Letters Patent of the United States is:

1. In a dynamoelectric machine, an internally cooled electrical conductor bar comprising at least two bar portions secured together, a continuous spacer wire interposed between and separating said main bar portions and forming a cooling passageway through said conductor bar, said continuous spacer wire extends over at least a portion of said conductor bar in a serpentine manner so as to form a passageway.

2. An electrical conductor bar assembly as described in claim 1 wherein said spacer wire extends beyond each side of said conductor bar and is bent so as to engage the sidewalls of either of said bar portions in order to maintain said spacer wire in fixed relation to said bar portions when said conductor bar is assembled.

3. In a dynamoelectric generator, an internally cooled electrical conductor bar comprising at least two elongated bar portions secured together, a spacer wire interposed between and separating said bar portions, said spacer wire continuously extending over at least a portion of said conductor bar in a serpentine manner so as to form a plurality of substantially transversely extending cooling passageways through said conductor bar, said spacer wire at each side of said conductor bar extending beyond said side and being bent against the sidewall of one of said bar portions so as to maintain said spacer wire relatively positioned with respect to said conductor bar.

References Cited

UNITED STATES PATENTS 2,791,707   5/1957   Willyoung _____ 310—64

FOREIGN PATENTS 55,914   1912   Austria.
1,221,503   7/1958   France.

WARREN E. RAY, Primary Examiner

R. SKUDY, Assistant Examiner

U.S. Cl. X.R.

310—61, 269